United States Patent [19]

Janson

[11] Patent Number: 4,860,845
[45] Date of Patent: Aug. 29, 1989

[54] FOUR WHEEL STEERING SYSTEM

[75] Inventor: David A. Janson, Plymouth, Mich.

[73] Assignee: Eaton Corporation, Cleveland, Ohio

[21] Appl. No.: 240,880

[22] Filed: Sep. 2, 1988

[51] Int. Cl.$^4$ .............................................. B62D 5/06
[52] U.S. Cl. .................................... 180/140; 180/141; 280/91
[58] Field of Search .................... 180/140, 141; 280/91

[56] References Cited

U.S. PATENT DOCUMENTS 4,776,418  10/1988  Winckler ............................ 180/140
4,776,419  10/1988  Walton ............................... 180/140

Primary Examiner—Charles A. Marmor
Assistant Examiner—Donn McGiehan
Attorney, Agent, or Firm—P. S. Rulon

[57] ABSTRACT

A closed hydraulic system (22 or 200) is provided for transmitting steering movement to a rear wheel steering assembly (16) in response to steering movment of a front wheel steering assembly (14). The front wheel steering assembly is controlled by a steering wheel (18) and a power steering assembly (20). The closed hydraulic system (22) includes a pump assembly (50) and an actuator assembly (52) connected together by conduits to define closed fluid flow branches (104,106) for moving a piston (90) in the actuator assembly in response to movement of a piston (72) in the pump assembly. In one embodiment (22) movement of the actuator piston is transmitted to the rear wheel steering assembly via a cam assembly which effects same direction rear wheel steering for rather small front wheel steering angles and which effects opposite direction rear wheel steering for greater front wheel steering angles. In another embodiment (200), the actuator piston (214) is connected directly to the rear wheel steering assembly. Both embodiments include a make-up valve (66) connected to an accumulator functioning as a reservoir to replace system fluid lost by leakage. The system embodiment (200) is provided with a valve for reversing fluid flow from the pump to the actuator to enable the actuator to provide same and opposite direction rear wheel steering relative to the front wheels.

7 Claims, 4 Drawing Sheets

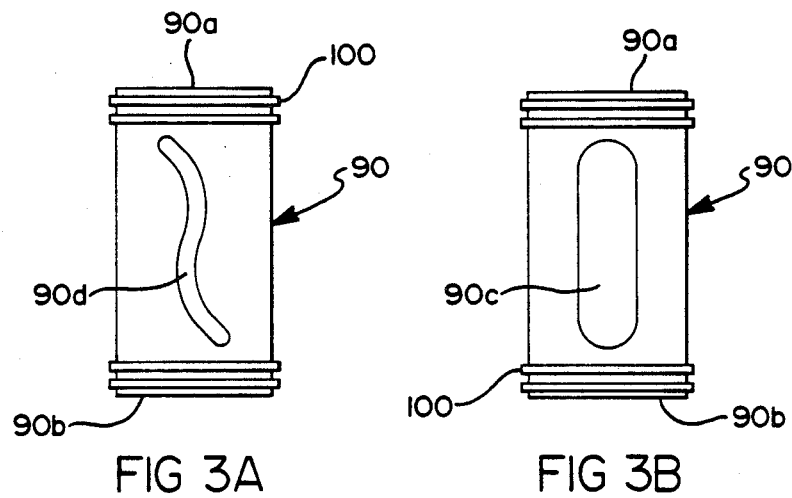
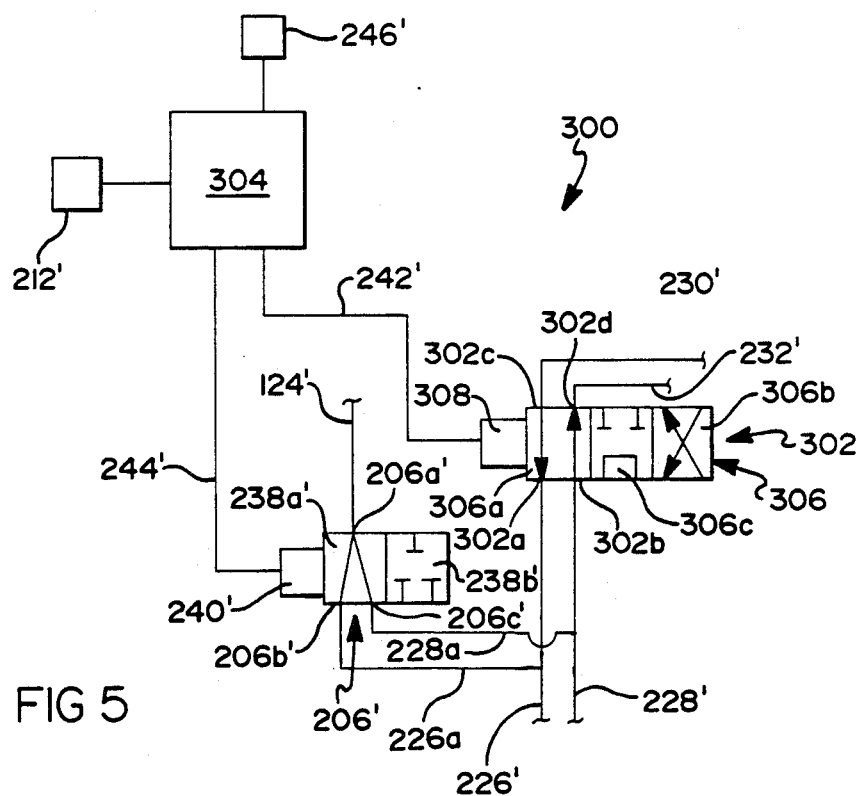

FOUR WHEEL STEERING SYSTEM

FIELD OF INVENTION

The present invention relates to four wheel steering. More specifically, the invention relates to apparatus for transmitting steering movement to a rear wheel steering assembly of a vehicle in response to steering movement of a front wheel steering assembly.

DESCRIPTION OF THE PRIOR ART

The purpose of four wheel steering is of course to reduce vehicle turning radius and/or to improve high speed performance of the vehicle. It is known to employ electrical, electrohydraulic, hydromechanical, or mechanical apparatus to transmit steering movement to rear wheel steering assemblies of vehicles in response to steering movement of front wheel steering assemblies. In practice, implementation of such apparatus has been expensive, has been somewhat unreliable, and/or has provided less than optimum performance. Further, hydromechanical and mechanical apparatus have been difficult to package into available vehicle space and have been difficult to protect against the harsh environment in which vehicles operate.

In a known four wheel steering system, steering movement of a front wheel steering assembly is transmitted to a rear wheel steering assembly via a mechanical apparatus in the form of a rotatably mounted shaft means extending longitudinally of the vehicle between the front and rear wheel steering assemblies. The rotatably mounted shaft means senses steering movement of the front wheel steering assembly and also transmits power for steering the rear wheel steering assembly. It is also known to convert this mechanical apparatus to a hydromechanical apparatus by connecting the output of the rotatably mounted shaft to a valve which ports pressurized hydraulic fluid from a motor driven pump to a power cylinder operative to transmit steering movement to the rear wheel steering assembly. It is also known to provide such mechanical and hydromechanical apparatus with a geared transmission operative to reverse the output direction of the rotatably mounted shaft means when the steering angle of the front wheel steering assembly exceeds a predetermined amount, thereby changing the steering direction of the rear wheels relative to the front wheels from the same direction to opposite direction.

SUMMARY OF THE INVENTION

An object of this invention is to provide inexpensive and reliable apparatus for transmitting steering movement to a rear wheel steering assembly.

Another object of this invention is to provide such an apparatus which is also readily packaged into available space of vehicles.

Another object of this invention is to provide simple, inexpensive, and reliable means for reversing the steering angle of the rear wheels when the steering angle of the front wheels exceeds a predetermined angle.

According to a feature of the invention, a steering apparatus for a wheeled vehicle having front and rear dirigible wheel assemblies comprises first means for transmitting left and right steering movement to a front wheel steering assembly in response to a steering wheel being turned left and right from a neutral position to effect left and right steering angles of the front wheels; and second means for transmitting steering movement to a rear wheel steering assembly in response to steering movement of the front wheel steering assembly. The second means is characterized by a closed hydraulic system having first and second fluid flow branches comprising: a fluid displacement assembly and a hydraulic actuator assembly each including a reciprocal piston disposed in a bore of a housing defining a first and a second variable fluid volume at each end of the piston, the assemblies including means for mechanically connecting the displacement and actuator pistons respectively to the front and rear wheel steering assemblies; the first and second fluid flow branches respectively including one volume of each assembly; and a control assembly including a rear wheel steering direction valve interposed in the branches between the assemblies, and having a valving member movable to a same direction position interconnecting the first and second displacement assembly volumes respectively with the first and second actuator assembly volumes for effecting same direction steering of the front and rear wheels and movable to an opposite direction position interconnecting the first and second displacement assembly volumes respectively with the second and first actuator assembly volumes for effecting opposite direction steering of the front and rear wheels.

BRIEF DESCRIPTION OF THE DRAWINGS

A steering system according to the present invention is shown in the accompanying drawings in which:

FIGS. 3A, 3B are relief views of a component in FIG. 2;

FIG. 5 illustrates an alternative control logic from the system of FIG. 4.

DETAILED DESCRIPTION OF THE DRAWINGS

Figure 1:
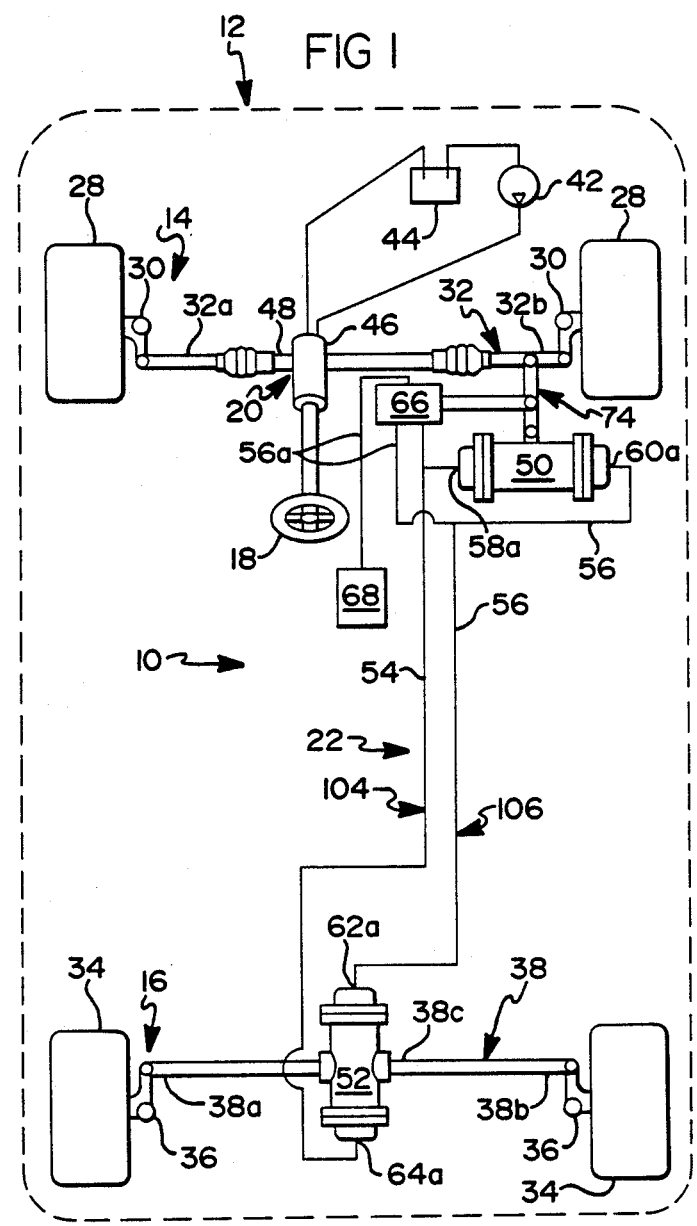
FIG. 1 is a schematic plan view of a steering system of the invention disposed between front and rear wheel steering assemblies of a vehicle.

The schematic plan view of FIG. 1 illustrates a steering system 10 for a wheeled vehicle having a body and chassis represented by phantom line 12, and front and rear steerable wheel assemblies 14, 16. The system includes a steering wheel 18, a power steering assembly or first means 20 for transmitting steering movement of the steering wheel to the front wheel steering assembly, and a closed hydraulic system or second means 22 for transmitting steering movement of the front wheel steering assembly to the rear wheel steering assembly.

The front wheel steering assembly 14 includes front wheels 28 each having a steering knuckle arm 30 pivotally connected together by tie rod ends 32a, 32b of a tie rod or ram 32 disposed for to-and-fro movement transverse to the longitudinal direction of the vehicle in known manner. The tie rod or ram 32 forms part of apparatus 20 and is discussed further hereinafter. The rear wheel steering assembly 16 includes rear wheels 34 each having a steering knuckle arm 36 pivotally connected together by tie rod ends 38a, 38b of a tie rod or ram 38 disposed for to-and-fro movement transverse to the longitudinal direction of the vehicle.

Assembly 20 may be any of several well known mechanical non-power or power steering assemblies which transmit steering movement to the front wheel steering assembly in response to steering movement of the steering wheel. Apparatus 20 is preferably of the power steering type and, as illustrated therein, is of the well known hydraulic type including a source of pressurized hydraulic oil or fluid provided by a pump 42 in known manner, a sump 44, and a servo valve 46 for connecting or communicating the source and sump with opposite sides of an unshown piston disposed in a power cylinder 48. Tie rod ends 32a, 32b extend from opposite sides of the piston and move together in to-and-fro motion in response to alternate porting or communication of opposite sides of the unshown power cylinder piston with the source and sump by valve 46.

Closed hydraulic system 22 includes a pump assembly 50, an actuator assembly 52, conduits or passages 54,56 respectively connected at one end to ports 58a,60a defined by end caps 58,60 of the pump assembly and respectively connected at the other end to ports 62a,64a defined by end caps 62,64 of the actuator assembly. System 22 also includes a make-up valve assembly 66 and an accumulator assembly 68 providing a source of low pressure fluid.

Pump assembly 50 includes a cylinder portion or center housing member 70 secured to the vehicle chassis and defining a cylindrical bore 70a having an opening 70b, a reciprocal piston member 72 slidably disposed in the bore and having ends 72a,72b, the end caps 58,60, and a lever arm 74 mounted for pivotal movement intermediate its ends 74a,74b on a pin 76 fixed relative to the pump assembly housing. Lever end 74a includes a roller 78 received in a piston recess 72c and end 74b is pivotally secured to tie rod end 32b by a pin 80. Piston ends 72a,72b and end caps 58,60 respectively define variable fluid volumes 82,84 sealed from each other and cylinder opening 70b by dynamic seals 86 which may be of the O-ring type. Alternatively, the piston ends may be sealed by roll type diaphragms such as disclosed in co-pending U.S. application Ser. No. 138,762, filed 12-28-87 and incorporated herein by reference. The end caps are secured and sealed to the housing in known manner, e.g., by unshown screws and gaskets.

Actuator assembly 52 includes a cylindrical portion or center housing member 88 secured to the vehicle chassis and defining a cylindrical bore 88a, a reciprocal piston member 90 slidably disposed in the bore, and having ends 90a,90b, the end caps 62,64; springs 92,94 for centering the piston axially in the bore 88a, and a portion 38c of tie rod 38 intermediate tie rod ends 38a,38b. Piston ends 90a,90b and end caps 62,64 cooperate to define variable fluid volumes 96,98 sealed from each other by dynamic seals 100 which, like seals 86, are preferably of the O-ring type but may be of the roll diaphragm type. In a manner analogous to pump 50, end caps 62,64 are secured and sealed to the housing member in known manner.

Housing 88 includes axially aligned bores 88b,88c slidably supporting tie rod portion 38c for movement along an axis diametrical to cylinder bore 88a and piston 90. Piston 90 includes a flat slot 90c therethrough slidably receiving tie rod portion 38c and allowing to-and-fro movement of the piston normal to the tie rod portion. Piston 90 also includes an s-shaped cam slot 90d extending therethrough and receiving opposite ends of a pin cam follower 102 extending diametrically through tie rod portion 38c for effecting movement of the tie rod in response to to-and-fro or reciprocal movement of the piston and in accordance with the shape of the cam slot.

Make-up valve and accumulator assemblies 66,68 include housings shown herein for illustrative purposes as one piece housings 108,110 respectively. Accumulator housing 110 includes a cylindrical bore 110a having a free piston 112 slidably disposed therein and separating the bore into variable volume chambers 114,116 sealed from each other by dynamic seals 118. Chamber 114 contains a compressible fluid such as air and chamber 116 contains non-compressible oil of the type used in the closed hydraulic system. A change valve 120 provides means for changing chamber 114 with air. A port 110b provides oil access to chamber 116. Accumulator 68 functions as a reservoir for the closed hydraulic system and as such it need only provide pressure sufficient to ensure the system is fully charged. Several known devices are capable of this reservoir function, e.g., a low pressure oil pump, a reservoir providing a head of pressure, a diaphragm type accumulator, etc.

As thus far described, conduit 54, pump volume 82 and actuator volume 98 define a first closed fluid flow branch 104; and conduit 56, pump volume 84 and actuator volume 96 define a second closed fluid flow branch 106. The branches are filed with a non-compressible hydraulic oil. Hence, sliding movement of pump piston 72 in response to steering movement of the front wheel steering tie rod 32 causes fluid flow in both branches and a corresponding sliding movement of actuator piston 90 and rear wheel steering tie rod 38. The pistons move in proportion to their surface areas. Accordingly, rear wheel steering tie rod 38 moves in proportion to movement of piston 90 and in accordance with the profiles of the s-shaped cam 90d. In the disclosed embodiment of FIG. 2, the s-shaped cam profiles are selected to first move tie rod 38 in directions effecting same direction steering of the front and rear wheels and then opposite direction steering in response to increased front wheel steering angles. By way of example, maximum same and opposite direction steering angles of the rear wheels may be two degrees and six degrees, respectively. However, as may be seen, the cam profiles are readily changed to provide other same and opposite direction steering angles. Further, the profiles may be selected to provide only same direction steering, opposite direction steering, and/or steering angles that are not the same for left and right turns.

Make-up valve housing member 108 includes a cylindrical bore 108a having a spool valving member 122 disposed therein, a port 108b in constant communication with the low pressure oil in accumulator chamber 116 via a conduit 124, and ports 108c,108d respectively in constant communication with closed hydraulic system branches 104,106 via make-up conduits 54a,56a respectively connected to conduits 54,56. Valving member 122 includes a stem portion 122a slidably and sealingly extending through an opening 108e in the housing end, an end pivotally connected to pump lever arm 74 by a pin 124, and axially spaced apart lands 122b,122c in sliding, sealing contact with housing bore 108a.

Figure 2:
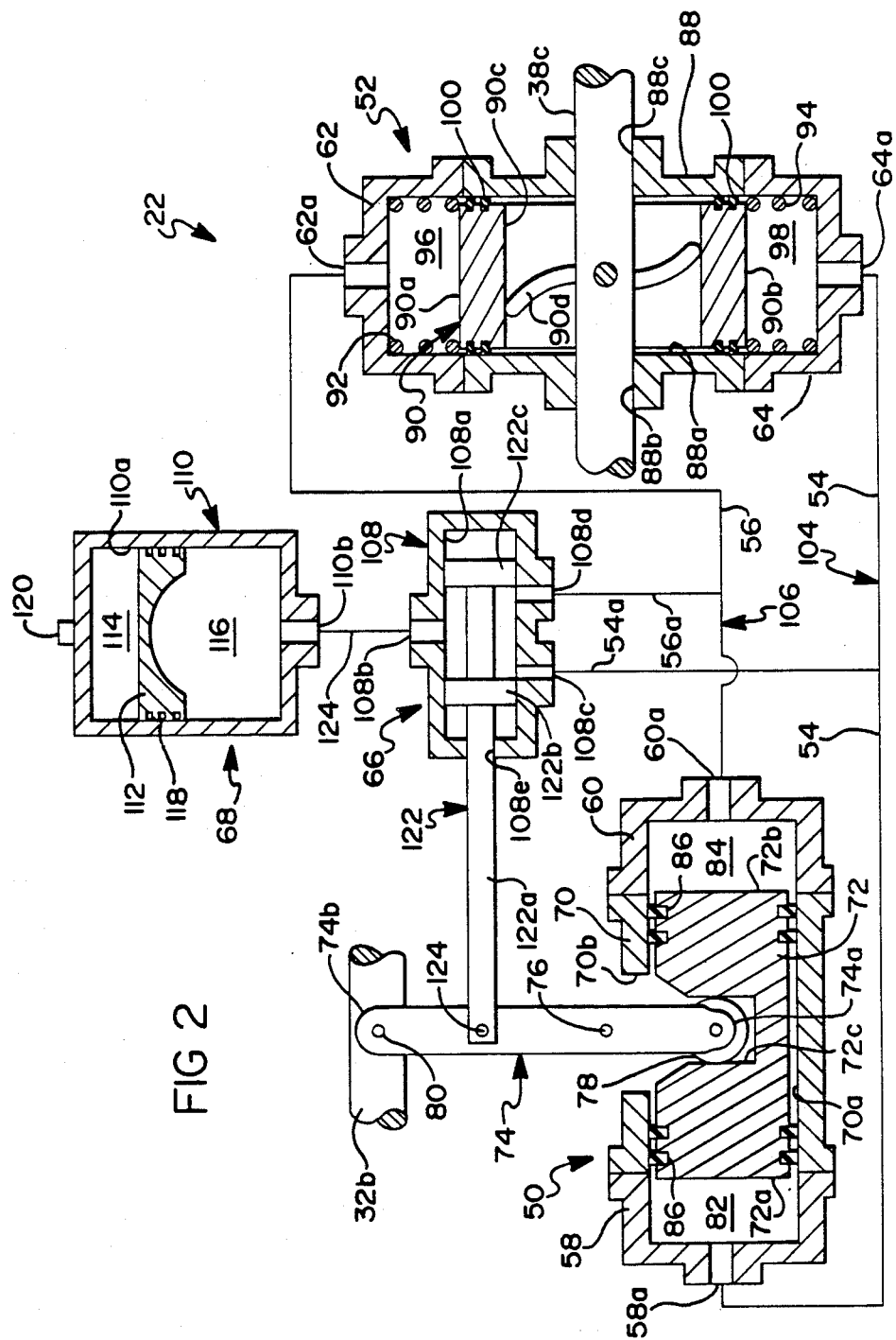
FIG. 2 is detailed schematic view of components in the system of FIG. 1.
Figure 4:
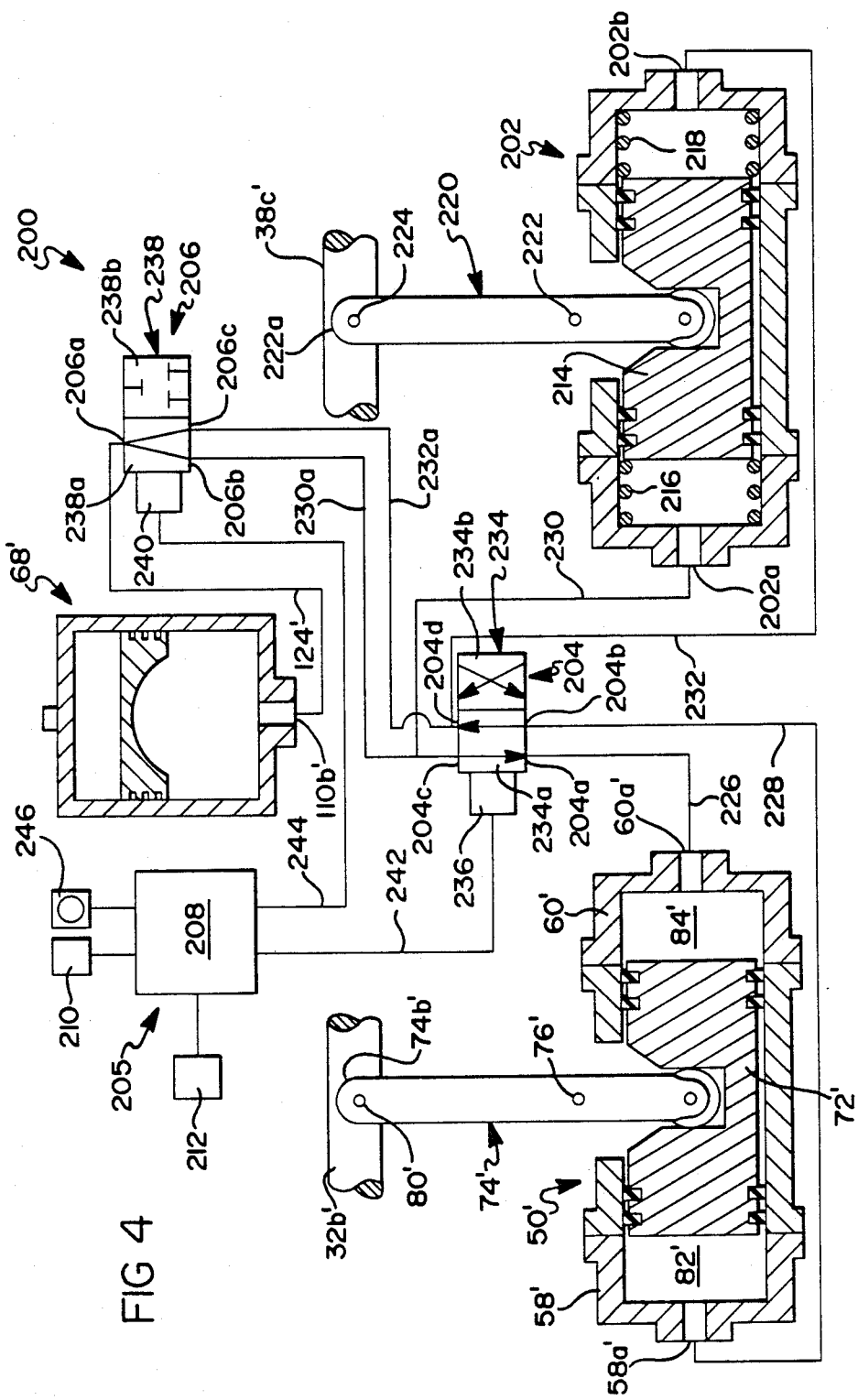
FIG. 4 is detailed schematic of an alternative embodiment of the system of FIGS. 1 and 2.

System 22 is shown in the neutral position in FIGS. 1 and 2, i.e., the front and rear wheels are being steered straight ahead, the pump and actuator pistons are axially centered in their respective bores, and valving member lands 122b,122c allow free communication of oil between accumulator chamber 116 and conduits 54,56, whereby branches 104,106 are fully changed with oil under relatively low pressure. When the front wheels are steered leftward, front wheel tie rod end 32b moves rightward, thereby pivoting lever arm 74 clockwise about pin 76 to effect rightward axial movement of make-up valve spool valving member 122 and leftward axial movement of pump piston 72. Rightward movement of spool valving member 122 causes land 122b to move to a position blocking port 108c. Leftward movement of pump piston 72 displaces oil from pump chamber 82 to actuator chamber 98 to effect upward movement of actuator piston against the biasing force of spring 92 and the force needed to steer the rear wheels, thereby causing the relatively low oil pressure in conduit 54 to quickly exceed the low oil pressure provided by accumulator 68 and rise to an operational pressure suffice to steer the rear wheels. Accumulator 68 and make-up valve 66 provide for replacement of any oil leakage in branches 104,106, and for oil expansion/contraction due to temperature changes.

Looking now at a second closed hydraulic system embodiment 200, therein components substantially identical to components in system 22 are given the same reference number with the addition of a prime suffix. System 200 includes a pump assembly 50', an actuator assembly 202 having ports 202a,202b analogous to ports 62a,64a of actuator 52, an accumulator assembly 68', and a control assembly 205. The control assembly comprises a steering direction valve 204, a make-up/shut-off valve 208, an electronic control logic 206 which receives signals from a vehicle speed sensor 210 and a steering wheel position sensor 212. Actuator assembly 202 differs from pump assembly 50' in that a piston 214 therein is centered by springs 216,218, and a lever arm 220 thereof is mounted for pivotal movement about a pin 222 and is connected at its upper end 222a to rear wheel steering tie rod portion 38c by a pin 224. Steering direction valve 204 and make-up/shut-off valve 206 respectively replace the s-shaped cam and the make-up valve of FIG. 2.

Steering direction valve 204 includes ports 204a,204b respectively connected to pump ports 60a',58a' via conduits 226,228, ports 204c,204d respectively connected to actuator ports 202a,202b via conduits 230,232, and a valving member 234 moved by a solenoid 236 between an opposite steering direction position 234a and a same direction steering position 234b. Make-up/shut-off valve 206 includes a port 206a connected to accumulator port 110b' via a conduit 124 and ports 206b,206c respectively connected to conduits 230,232 via conduits 230a,232a, and a valving member 238 moved by a solenoid 240 between a position 238a wherein system 200 is provided with make-up oil and is shut off or rendered inoperative and a position 238b wherein the system is made operative. Solenoids 236,240 are electrically connected to logic 208 via a lines 242,244, respectively.

In a preferred mode of operation for system 200, logic 208 provides signals to solenoid 240 via line 244 for moving valving member 238 from make-up/shut-off position 238a to position 238b when steering wheel position sensor 212 indicates that the steering wheel has moved a predetermined distance from neutral or straight ahead steering of the front wheels. A switch 246 may also be provided for selectively maintaining valve 238 in position 238a. Logic 208 also provides signals to solenoid 236 for positioning valving member 234 in the opposite direction steering position 234a when speed sensor 212 indicates a vehicle speed less than a predetermined amount, e.g., twenty-two miles per hour (35 Km/hr). For vehicle speeds greater than the predetermined amount, the logic moves valving member 234 to the same direction steering position.

An alternative control assembly 300 comprises repositioning make-up/shut-off valve assembly 206', optionally replacing two position steering direction valve assembly 204 with a three position steering direction valve assembly 302, and controlling valve assembly 302 as a function of throttle position rather than vehicle speed. More specifically, make-up/shut-off valve port 206a' is connected to accumulator 68 via a conduit 124', ports 206b',206c' are connected to conduits 226',228' via conduits 226a,228a, respectively, and solenoid 240' is connected to and controlled by logic 304 via conductor line 244' in the same manner as with control logic 208. Logic 304 receives steering wheel position signals from a position sensor 212' and switch 246'. Steering direction valve assembly 302 includes ports 302a,302b respectively connected to conduits 226',228', ports 302c,302d respectively connected to conduits 230',232', a valving member 306 moved by a solenoid assembly 308 between opposite and same direction steering positions 306a,306b analogous to positions 234a,234b, and a center position 306 for hydraulically locking actuator piston 214 and interconnecting conduits 226',228' for allowing free movement of pump piston 72'. Control logic 304 provides signals via conductor line 242' to solenoid assembly 308 to move or maintain valving member 306 in same direction steering position 306b for steering wheel positions providing left and right front wheel steering angles up to about one-quarter maximum steer angles, signals to the solenoid assembly to move or maintain the valving member in opposite direction steering position 306a for steering wheel positions providing left and right front wheel steering angles greater than about three-eights maximum steer angles, and signals to the solenoid assembly to move or maintain the valving member in center position 306c for steering wheel positions providing left and right front wheel steering angles between about one-quarter and three-eights maximum.

Two embodiments of the invention have been disclosed therein for illustrative purposes. Many variations and modifications of the disclosed embodiments are believed to be within the spirit of the invention. For example, make-up valve 66 in system 22 may be employed in the system 200 in lieu of valve 206. The following claims are intended to cover the inventive features of the disclosed embodiments and variations and modifications believed to be within the spirit of the invention.

What is claimed is:

1. A steering apparatus for a wheeled vehicle having front and rear dirigible wheel assemblies, the apparatus comprising:
   first means for transmitting left and right steering movement to a front wheel steering assembly in response to a steering wheel being turned left and right from a neutral position to effect left and right steering angles of the front wheels;
   second means for transmitting steering movement to a rear wheel steering assembly in response to steering movement of the front wheel steering assembly; the second means characterized by:
   a closed hydraulic system including first and second closed fluid flow branches comprising a fluid displacement assembly and a hydraulic actuator assembly each including a reciprocal piston disposed in a bore of a housing defining a first and a second variable fluid volume at each end of the piston, the system including means for mechanically connecting the displacement and actuator pistons respectively to the front and rear wheel steering assemblies;

the first and second fluid flow branches respectively including one volume of each assembly; and a control assembly including a rear wheel steering direction valve interposed in the branches between the assemblies, and having a valving member movable to a same direction position interconnecting the first and second displacement assembly volumes respectively with the first and second actuator assembly volumes for effecting same direction steering of the front and rear wheels and movable to an opposite direction position interconnecting the first and second displacement assembly volumes respectively with the second and first actuator assembly volumes for effecting opposite direction steering of the front and rear wheels.

2. The steering apparatus of claim 1, wherein the control assembly includes:

actuation means operative to move the valving member of the direction valve to the same direction position for front wheel steering angles less than a first predetermined amount and then to the opposite direction position for front wheel steering angles greater than a second predetermined amount.

3. The steering assembly of claim 2, wherein the first and second predetermined amounts are the same.

4. The steering apparatus of claim 2, wherein the actuation means is operative to move the valving member of the direction valve to a third position interconnecting the displacement assembly volumes and hydraulically locking the actuator assembly volumes in response to front wheel steering angles between the first and second predetermined amounts.

5. The steering apparatus of claim 1, wherein the control assembly includes:

actuation means operative to move the valving member of the direction valve to the same direction position in response to vehicle speed being less than a first predetermined amount and to the opposite direction position in response to vehicle speed being greater than a second predetermined amount.

6. The steering assembly of claim 5, wherein the first and second predetermined amounts are the same.

7. The steering apparatus of claim 5, wherein the actuation means is operative to move the valving member of the direction valve to a third position interconnecting the displacement assembly volumes and hydraulically locking the actuator assembly volumes in response to vehicle speed being between the first and second amounts.

* * * * *